April 15, 1930.  R. A. COCHRAN  1,754,979
CULINARY UTENSIL
Filed Feb. 11, 1929
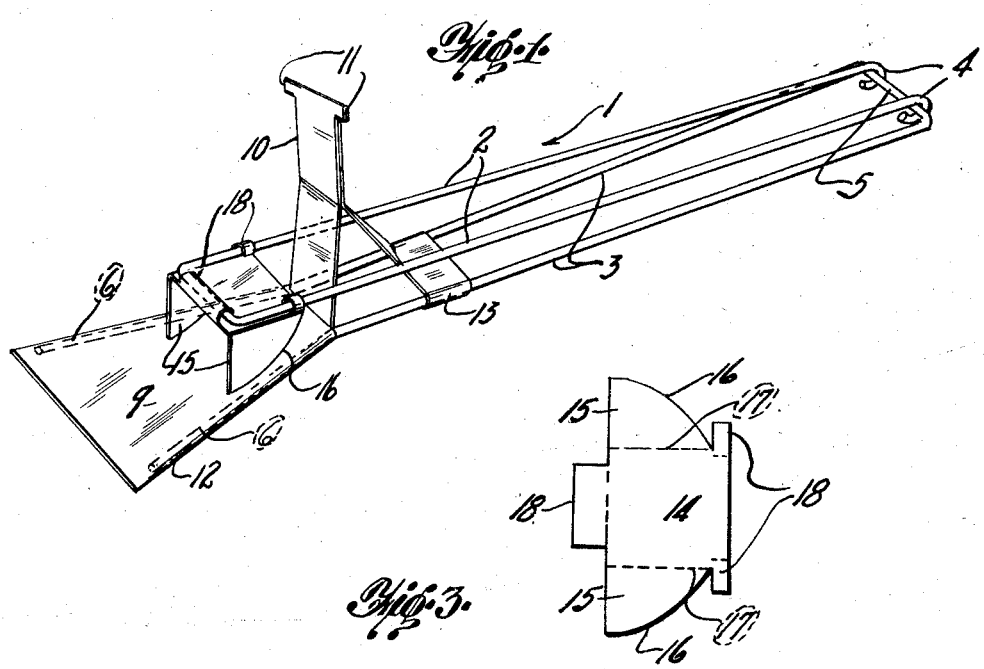
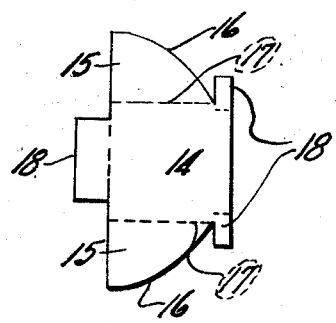
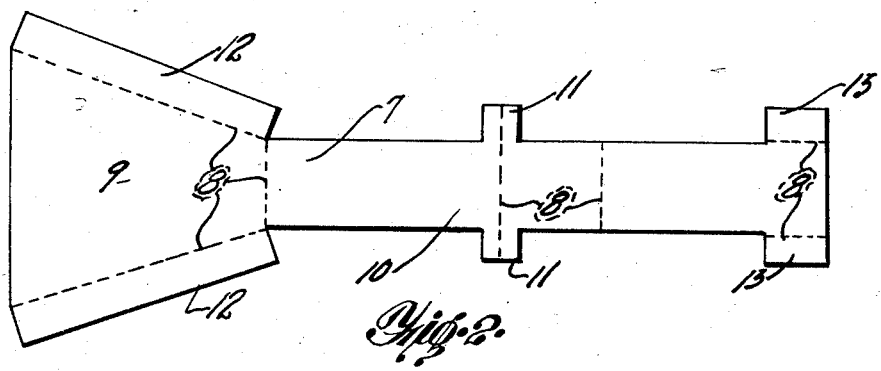
Inventor
Royal A. Cochran.
By Adam E. Fisher.
Attorney Patented Apr. 15, 1930

1,754,979

UNITED STATES PATENT OFFICE

ROYAL ALBERT COCHRAN, OF ATKINS, LOUISIANA

CULINARY UTENSIL

Application filed February 11, 1929. Serial No. 339,081.

This invention relates to culinary utensils and more particularly to pan lifters.

The main object of the invention is to provide a device for lifting and holding pie pans and like utensils so that the hands of the user need not come in contact with the pan.

Another object is to provide a device for this purpose which will be simple and durable in form and efficient in fulfilling its functions.

The foregoing and other objects together with means whereby the same may be carried into effect will best be understood from the following description of a preferred embodiment of the invention taken in connection with the accompanying drawing in which:

Figure 1 is a perspective view of the device.

Figure 2 is a plan view of the blank form which the lifting plate and guard are formed.

Figure 3 is a plan view of the blank from which the clamp or grip is formed.

Referring now more particularly to the drawing the reference numeral 1 denotes a handle comprising an upper section 2 and a lower section 3 each formed of a single length of wire bent into a U-shape with the legs of the upper section 2 looped at 4 around the bight 5 of the lower section 3. By this means the said sections 2 and 3 of the handle 1 are pivoted together so that they may be freely opened and closed in the operation of the device, in a manner to be pointed out. The ends of the legs of the lower section 3 are flared outwardly at 6 and for convenience in description this end of the device will be referred to as the forward end.

A blank 7 of suitable material and of the shape shown in Figure 2 is bent along the dotted bending lines denoted generally at 8 to form a forwardly flaring lifting plate 9, and an upwardly directed hand guard 10 with laterally extended stops 11 at its top. Marginal lugs 12 and 13 are curled around the legs of the lower section 3 of the handle to mount this plate and guard in place as clearly illustrated in Figure 1, the lateral dimensions of the guard 10 being such that the same will loosely fit between the legs of the upper handle section 2, the stops 11 serving to limit the opening or upward movement of this section 2 as will be understood.

The blank 14 shown in Figure 3 has the gripping blades 15 with the convex edges 16 which are bent at right angles to the remainder of the blank along the lines 17. The blank is then mounted upon the forward end of the upper handle section 2 forwardly somewhat of the guard 10 by curling the lugs 18 around this handle as shown.

In the use and operation of the device the upper handle section 2 is raised and the lifting plate 9 is placed under the bottom of the utensil to be lifted until the guard 10 contacts the rim thereof. Then by closing the section 2 the gripping blades 15 will grip the bottom and rim of the pan so that it can be lifted and handled with ease. The convex faces or edges 16 of the blades adapt them for gripping utensils having rims of any form. The guard 10 serves as a protection to the hand of the user as well as aiding in the secure gripping of the pan. The blades 15 will easily penetrate whatever pastry or other cooking there is in the pan leaving only two small slits when removed.

While I have herein set forth a certain preferred embodiment of the invention it is understood that I may vary from the same in minor structural details not departing from the spirit of the invention and within the scope of the appended claim.

I claim:

In a device of the character described, a handle comprising oppositely directed U-shaped upper and lower sections pivotally joined together at their rear end, a lifting plate secured to the forward end of the lower section, an upwardly extended hand guard at the rear of the lifting plate passing through the upper section of the handle, and downwardly directed gripping blades upon the forward end of the upper section of the handle.

In testimony whereof I affix my signature.

ROYAL ALBERT COCHRAN.